United States Patent [19]

Giroud

[11] Patent Number: 4,714,775
[45] Date of Patent: Dec. 22, 1987

[54] PHENYLCYCLOHEXYL DICARBOXYLATES

[75] Inventor: Anne-Marie Giroud, La Tronche, France

[73] Assignee: Commissariat a l'Energie Atomique, Paris, France

[21] Appl. No.: 913,938

[22] Filed: Oct. 1, 1986

[30] Foreign Application Priority Data

Oct. 2, 1985 [FR] France ............................ 85 14621

[51] Int. Cl.$^4$ ............................................ C07C 69/353
[52] U.S. Cl. .................................... 560/194; 560/204
[58] Field of Search .................................. 560/194, 204

[56] References Cited

U.S. PATENT DOCUMENTS 3,892,642  7/1975  De Schrijver et al. ......... 560/194 X
3,952,049  4/1976  Inamoto et al. ..................... 560/194

OTHER PUBLICATIONS

*Chemical Abstracts*, vol. 102, No. 25, 24/6/85, p. 565, No. 220581e.

Primary Examiner—Werren B. Lone
Assistant Examiner—Vera C. Clarke
Attorney, Agent, or Firm—Michael N. Meller

[57] ABSTRACT

The invention relates to novel phenylcyclohexyl dicarboxylates usable as liquid crystals or for improving the elastic properties of nematic liquid crystals.

These compounds are in accordance with formula (I)

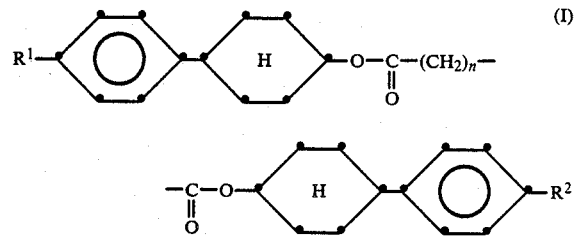

in which $R^1$ and $R^2$, which can be the same or different, represent a hydrogen atom or an alkyl radical having 1 to 12 carbon atoms and n is an integer between 2 and 16.

They can be prepared by reacting the diacid of formula $HOOC(CH_2)_n$—COOH with corresponding substituted phenylcyclohexanols.

5 Claims, No Drawings

PHENYLCYCLOHEXYL DICARBOXYLATES

BACKGROUND OF THE INVENTION

The present invention relates to novel compounds of the phenylcyclohexyl dicarboxylate type and to the preparation process for these.

More specifically, it relates to producing novel liquid crystals or non-mesomorphic compounds able to improve the elastic behavior of nematic liquid crystals usable in devices making use of the electrically controlled birefringence effect.

This effect corresponds to a deformation under an electric field of a nematic phase with negative dielectric anisotropy $\Delta\epsilon$, the latter representing the difference between the dielectric constant $\epsilon_a$ parallel to the major molecular axis of the crystal and the dielectric constant $\epsilon_b$ perpendicular to said axis.

In liquid crystal devices, it is necessary to use nematic materials permitting a high degree of multiplexing, i.e. a large number of electrically addressable screen lines, in order to display a large amount of information. This multiplexing level k can be expressed as a function of the voltage applied to the terminals of the device (V) and the crystal deformation threshold voltage ($V_S$) by the formula:

$$k < \left( \frac{V^2 + V_S^2}{V^2 - V_S^2} \right)^2$$

For a given multiplexing level, it is necessary to have a molecular tilt angle ($\Phi_M$) in the center of the liquid crystal cell which is as large as possible, in order to obtain the optimum contrast between the two black and white states of the crystal under the action of the electric field. For small tilt angles $\Phi_M$ is directly linked with the crystal deformation threshold voltage $V_S$ and the ratio of the elastic constants of bending $K_{33}$ and fanning $K_{11}$ of the liquid crystal. Thus, $\Phi_M$ is given by the formula:

$$\Phi_M = \frac{V^2 - V_S^2}{V^2(1 + \left|\frac{\Delta\epsilon}{\epsilon}\right|) - \eta_{31} V_S^2}$$

$$\text{with } V_S = 2\pi \sqrt{\frac{\pi K_{33}}{\Delta\epsilon}}$$

$$\Delta\epsilon = \epsilon_a - \epsilon_b$$

$$\text{in which } \pi_{31} = \frac{1 - K_{33}}{K_{11}}$$

Under these conditions, the electrically induced birefringence is then of form:

$$\Delta n = \left( \frac{\sin^2\Phi}{n_o^2} + \frac{\cos^2\Phi}{n_e^2} \right)^{\frac{1}{2}} - n_o$$

$$\text{with } \Phi = \Phi_M \cos\frac{\pi}{e} Z$$

in which $n_e$ and $n_o$ are extraordinary and ordinary indices of the crystal, e the thickness of the liquid crystal and Z its position in the cell.

The relative intensity transmitted by the liquid crystal device between two cross-polarizers is given by the relation:

$$\frac{I}{I_O} = \sin^2\pi \frac{\Delta n \, e}{\lambda}$$

in which $\Delta n$ is equal to $n_e - n_o$ and $\lambda$ is the wavelength of the light beam illuminating the device. Thus, the most important parameters of the material are $K_{33}/K_{11}$, $\Delta n$, $\Delta\epsilon$, as well as the mesomorphism range $\Delta T$ of the crystal. Among these parameters, an important part is played by the ratio $K_{33}/K_{11}$, because it determines the steepness of the slope of the electro-optical transfer curve and consequently the multiplexibility of the material used. This ratio must be as large as possible.

SUMMARY OF THE INVENTION

The present invention relates to novel compounds which can have a liquid crystal phase or can be added to a nematic liquid crystal to modify its elastic behavior by improving the value of ratio $K_{33}/K_{11}$.

The compounds according to the invention comply with formula:

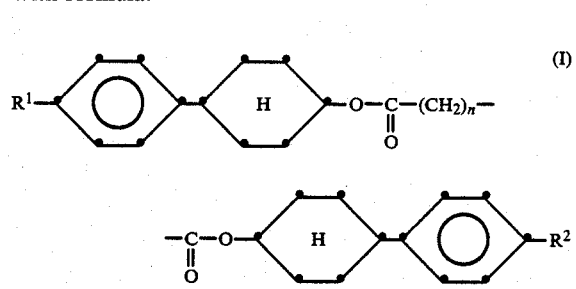

in which $R^1$ and $R^2$, which can be the same or different, represent a hydrogen atom or an alkyl radical with 1 to 12 carbon atoms and n is an integer between 2 and 16.

These compounds have rigid parts

having a structure close to that of nematic liquid crystals usable for display purposes and these rigid parts are interlinked by a flexible alkyl chain, which makes it possible to associate such compounds, when they are mesomorphic, with liquid crystals in order to modify the elastic behavior of the latter.

The compounds according to formula I can also be in the form of liquid crystals, e.g. smectic liquid crystals and therefore can have other applications.

The present invention specifically relates to a process for the preparation of compounds complying with the above formula I.

This process consists of reacting a dye acid of formula HOOC—$(CH_2)_n$—COOH, in which n is an integer from 2 to 16 with a phenylcyclohexanol of formula

and/or formula

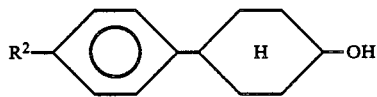

in which $R^1$ and $R^2$ are a hydrogen atom or an alkyl radical with 1 to 12 carbon atoms.

When $R^1$ and/or $R^2$ represent a hydrogen atom, phenylcyclohexanone constitutes the starting compound and it is reduced into phenylcyclohexanol by the action of lithium and aluminum hydride $LiAlH_4$ in the presence of ether.

When $R^1$ and/or $R^2$ are alkyl radicals of formula $C_mH_{2m+1}$ with m being an integer between 2 and 11, the corresponding substituted phenylcyclohexanols are prepared by starting with phenylcyclohexanol which is treated by acetic anhydride to obtain the acetic ester of phenylcyclohexanol of formula:

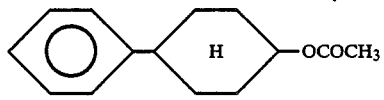

and said acetic ester of phenylcyclohexanol is treated with an acid chloride of formulas $R'^1COCl$ and/or $R'^2COCl$ in which $R'^1$ and $R'^2$ are radicals of formula $C_{m-1}H_{2m}$ with m having the meaning given hereinbefore, to obtain the compound with the following formula:

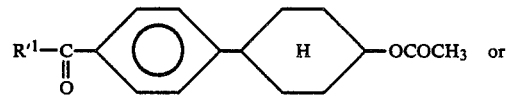

and performing said reaction in dichloromethane in the presence of aluminum chloride.

The thus obtained compound is then treated with soda to convert it into alkylcarbonyl phenylcyclohexanol of formula:

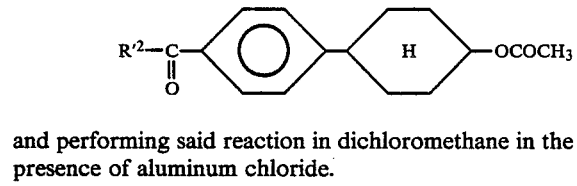

which is then reduced by hydrazine in the presence of diethylene glycol and potash to obtain the corresponding phenylcyclohexanols of formula:

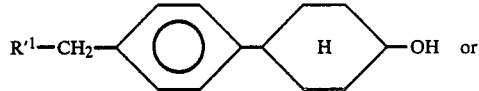

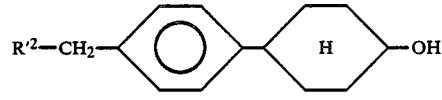

These phenylcyclohexanols are then reacted with the corresponding diacid by condensing at ambient temperature and using the Hassner method (Tetrahedron Letters, vol. 46, 4475, 1978), in which 1 mole of the diacid of N,N-dicyclohexyl-carbodiimide and 4-pyrrolidinopyridine in dichloromethane is added to 2 moles of the appropriate phenylcyclohexanol or phenylcyclohexanols.

When using two phenylcyclohexanols of formula:

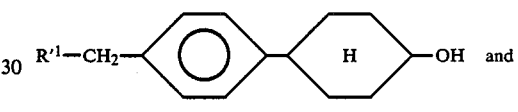

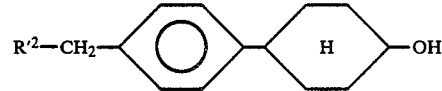

it is then necessary to separate the different compounds present in the reaction mixture in order to isolate the compound of formula I:

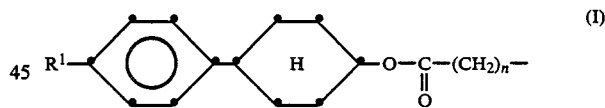

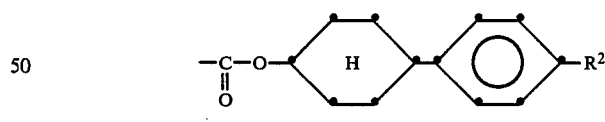

(I)

and this can be carried out by conventional methods.

Preference is given to the use of a single cyclohexanol and the compound obtained is of formula I, in which $R^1$ and $R^2$ are identical.

DESCRIPTION OF SPECIFIC EXEMPLIFIED EMBODIMENTS

Other advantages and features of the invention can be gathered from studying the following examples given in an illustrative and non-limitative manner.

EXAMPLES 1 AND 2

These examples illustrate the preparation of compounds of formula

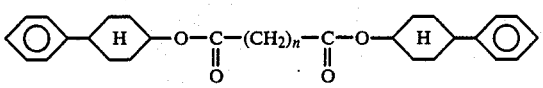

in which n=10 and n=14.

The starting compound is phenylcyclohexanol, which is formed by the reduction of phenylcyclohexanone by lithium and aluminum hydride in the presence of ether. The phenylcyclohexanol is then reacted with the diacid of formula HOOC—$(CH_2)_{10}$—COOH by dissolving in dichloroethane one mole of the diacid of N,N-dicyclohexylcarbodiimide and 4-pyrrolidinopyridine and then adding said solution to 2 moles of phenylcyclohexanol. This leads to the diester of formula:

(compound 1)

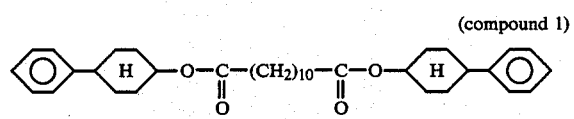

which has a melting point of 96° C.

The same operating procedure is used for preparing compound 2 of formula:

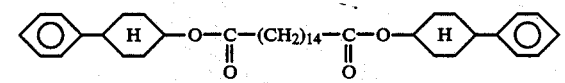

using as the diacid, the diacid of formula HOOC—$(CH_2)_{14}$—COOH.

EXAMPLES 3 TO 10

Preparation of compounds of formula I in which $R^1$ and $R^2$ both represent an alkyl radical. Firstly the phenylcyclohexanol of formula:

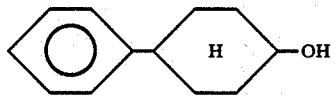

is formed by reducing the phenylcyclohexanone by means of lithium and aluminum hydride in the presence of ether. The phenylcyclohexanol then undergoes an acetylation reaction by acetic anhydride and is then converted into trans-4-alkanoylbenzyl-1-acetoxycyclohexanone by a Friedel-Crafts reaction with the appropriate acid chloride in dichloromethane, in the presence of aluminum trichloride and in accordance with the following reaction diagram:

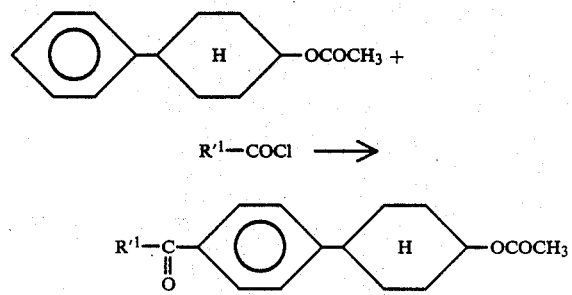

This is followed by the saponification of the ether by sodium hydroxide in methanol in order to obtain the following compound:

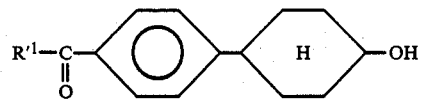

which is converted by reduction of the ketone group into substituted phenylcyclohexanol of formula:

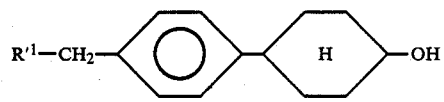

in which $R'^1$—$CH_2$ represents the radical $R_1$ or $R_2$. This reduction is performed by the Wolff Kishner reaction using hydrazine monohydrate in diethylene glycol. This substituted phenylcyclohexanol is then reacted with 1 mole of the diacid of formula HOOC—$(CH_2)_n$—COOH by adding 2 moles of trans-4-alkyl-1-phenylcyclohexanol to 1 mole of the diacid of N,N-dicyclohexylcarbodiimide and 4-pyrrolidinopyridine in dichloromethane. Following this operating procedure, compounds 3 to 10 of table 1 were prepared.

The properties of the thus obtained compounds were proved by investigating them with a calorimeter and by observing them with a polarizing microscope. The transition temperatures and molar enthalpy changes are given in table 2, which shows that only compound 6 has a stable mesophase at 107° C. An X-ray diffraction analysis of this compound indicates a highly organized smectic phase.

The non-mesomorphic compounds according to the invention can be used in mixed form with liquid crystals, such as 1-(alkylcyclohexyl)-2-(alkylfluorobiphenyl)-ethane for increasing the $K_{33}/K_{11}$ ratio of such compounds. Thus, a mixture of 1-(trans-4-n-ethylcyclohexyl)-2-[2'-fluoro-4'-(2-ethyl)-4-biphenylyl]-ethane $I_{22}$ and compound 1 containing 4.91% by weight of compound 1 has a $K_{33}/K_{11}$ ratio of 1.72, whilst compound $I_{22}$ alone has a $K_{33}/K_{11}$ ratio of 1.2.

TABLE 1

| COMPOUND | $R^1 = R^2$ | n |
|---|---|---|
| 1 CODDACO | H | 10 |
| 2 COHDACO | H | 14 |
| 3 C5DDAC5 | $C_5H_{11}$ | 10 |
| 4 C6DDAC6 | $C_6H_{13}$ | 10 |
| 5 C7DDAC7 | $C_7H_{15}$ | 10 |
| 6 C9DDAC9 | $C_9H_{19}$ | 10 |
| 7 C5HDAC5 | $C_5H_{11}$ | 14 |
| 8 C6HDAC6 | $C_6H_{13}$ | 14 |
| 9 C7HDAC7 | $C_7H_{15}$ | 14 |
| 10 C9HDAC9 | $C_9H_{19}$ | 14 |

TABLE 2

| Compounds | Heating Transition Temperatures °C. $T_{KI}$ or $T_{KM}$ | Cooling Transition Temperatures °C. |
|---|---|---|
| 1 $C_0$—DDA—$C_0$ | 96 [18.6] | |
| 3 $C_5$—DDA—$C_5$ | 98 [20.3] | 91 |
| 4 $C_6$—DDA—$C_6$ | 103 [16.71] | 95.6 [−17.9] |
| 5 $C_7$—DDA—$C_7$ | 101.6 [16.7] | 96 [−15.5] |
| 6 $C_9$—DDA—$C_9$ | 107 [19] | 101 smectic [−6.1] |

TABLE 2-continued

| Compounds | Heating Transition Temperatures °C. $T_{KI}$ or $T_{KM}$ | Cooling Transition Temperatures °C. |
|---|---|---|
| | | 96 [−11.3] |
| 7 C$_5$—HDA-C$_5$ | 115 [25.3] | 108.6 [−24.5] |
| 8 C$_6$—HDA-C$_6$ | 107.6 [20.3] | 100.6 [−18.7] |
| 9 C$_7$—HDA-C$_7$ | 105.8 [20.3] | 99.6 ]−17.8] |
| 10 C$_9$—HDA-C$_9$ | 107.2 [21.8] | 100.4 [−21.9] |

[ ] = Δ H in cal/g.

What is claimed is:

1. A compound of the formula:

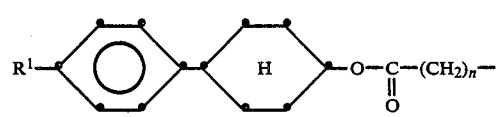 (I)

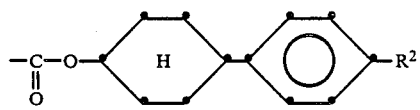

in which $R^1$ and $R^2$, which can be the same or different, represent a hydrogen atom or an alkyl radical having 1 to 12 carbon atoms and n is an integer between 2 and 16.

2. A compound according to claim 1, wherein $R^1$ and $R^2$ are identical.

3. A compound according to claim 1, wherein n=10 or 14.

4. A compound according to claim 2, wherein $R^1$ and $R^2$ represent a hydrogen atom or a pentyl, hexyl, neptyl or nonyl radical.

5. A compound according to claim 3, wherein $R^1$ and $R^2$ represent a hydrogen atom or a pentyl, hexyl, heptyl or nonyl radical.

* * * * *